Patented June 16, 1942

2,286,656

UNITED STATES PATENT OFFICE 2,286,656

PHOTOGRAPHIC PRINTING MATERIAL AND DEVELOPER

Oskar Süs, Wiesbaden-Biebrich, Germany, assignor to Kalle & Co. Aktiengesellschaft, Wiesbaden-Biebrich, Germany No Drawing. Application April 4, 1940, Serial No. 327,846. In Germany May 23, 1939

10 Claims. (Cl. 95—6)

The present invention relates to photographic printing materials for diazotype purposes and developers.

Only a few of the azo components hitherto suggested for diazo-types have attained industrial importance, this being due to the fact that many requirements of various kinds are placed upon photographic diazo prints and the light-sensitive materials used for their manufacture. The desired properties of the photographic printing papers and the finished prints depend to a considerable extent on the kind of the azo components used. A great number of azo components has already been suggested which fulfill in a satisfactory manner some of the existing requirements, such as good keeping quality of the photographic printing paper, stability of the finished prints, production of dark shades and the like. It has, however, not yet been possible to comply simultaneously with all requirements in practice so that endeavours still exist for finding new and improved azo components for diazotypes.

Now I have found that phloroglucine-mono-carboxylic acid alkyl esters are excellently suitable as azo components for diazotypes. The esters of phloroglucine-mono-carboxylic acid with aliphatic alcohols of low molecular weight, such as ethyl alcohol and especially methyl alcohol are particularly suitable. These esters may, for instance, be prepared by treating the readily accessible phloroglucine-mono-carboxylic acid with diazo-ethane or diazo-methane respectively. If required, substituents of the kind usual in diazotypes, such as chlorine or bromine may enter into the benzene nucleus of the azo components; care must, however, be taken, that the compounds remain capable of coupling. In general the substitution has, however, no improving action.

With the aid of the azo components used according to the present invention diazotypes are obtained which have a very good stability and do not detrimentally alter even after having been stored for a prolonged time. Moreover, their fastness to light is very good. The stability of the ground of the prints must be particularly emphasized. Even when storing the prints for a prolonged time it can hardly be observed that the white turns yellow. The prints are furthermore distinguished by the fact that they are very rich in contrast; they have very dark blue lines. The resistance to water of the prints is likewise very good. Moreover, it is of industrial importance that the photographic printing materials not exposed to light likewise possess very good properties. Their stability for instance is considerably better than that of the photographic printing papers prepared with the aid of phloroglucine.

Since the phloroglucine-mono-carboxylic acid alkyl esters constitute relatively slowly coupling azo components there may be prepared therewith two-component-papers of a good stability which may be developed by the dry method. In this case the azo components are suitably used together with the diazo compounds usually applied for photographic printing processes, particularly with para-amino-diazo compounds of the benzene series. It will not be necessary to describe in detail the diazo compounds to be used according to the present process because said compounds are well known by the pertaining literature to everybody skilled in the art. The new azo compounds may also be used for developing purposes by the moist process. Very useful developers are obtained for this process by combining the azo components with a salt of an alkaline reaction, such as sodium carbonate, sodium bicarbonate, borax or the like.

Various processes are already known for applying other phloroglucine derivatives as well as the phloroglucine itself as azo components for diazotype processes. The known azo components are, however, far inferior, as regards the properties named, to those used according to the present invention.

The following examples serve to illustrate the invention, but they are not intended to limit it thereto:

(1) 1.25 grams of the diazo compound of para-amino-diethyl-aniline, 1 gram of tartaric acid and 2.5 grams of thio-urea are dissolved in a solution of .25 gram of phloroglucine-mono-carboxylic acid methyl ester in 50 cc. of water. By painting the solution thus obtained on to paper a highly valuable photographic diazo printing material is obtained.

Instead of the diazo compound named there may be used for instance the diazo compound from 1-amino-4-dimethyl-amino-benzene. In a similar manner diazo compounds of a different kind, for instance diazo anhydrides may be used. By way of example there may be named the diazo compound of 1.2.4-amino-naphthol-sulfonic acid.

(2) 1.2 grams of the diazo compound from 1-monoethyl-amino-4-amino-benzene, 1 gram of tartaric acid and 2.5 grams of thio-urea are dissolved in 30 cc. of water. A solution of .25 gram of phloroglucine-mono-carboxylic acid ethyl ester in 20 cc. of water is added thereto. With the aid of the solution thus obtained paper, films or a similar base are sensitized. The prints prepared with the aid of the said material may be developed in known manner by means of ammonia gas.

I claim:

1. Photographic printing material consisting of a support carrying a layer which comprises a light sensitive diazo compound and as coupling component a phloroglucine-mono-carboxylic acid alkyl ester.

2. Photographic printing material according to claim 1 wherein the said diazo compound is a para-amino-diazo compound of the benzene series.

3. Photographic printing material according to claim 1 wherein the said alkyl ester group contains not more than two carbon atoms.

4. Photographic printing material consisting of a sheet support and a light sensitive layer on this support which layer comprises a para-amino-diazo compound of the benzene series and a phloroglucine-mono-carboxylic acid alkyl ester wherein the alkyl ester group contains not more than two carbon atoms.

5. A material of the kind described consisting of a support coated with a light sensitive layer which comprises besides a light sensitive diazo compound a coupling component of the following general formula

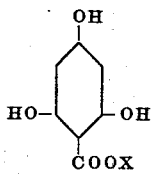

wherein X is a member of the group consisting of methyl and ethyl.

6. Photographic printing material according to claim 5 wherein the said diazo compound is a para-amino-diazo compound of the benzene series.

7. A new developer for diazotype purposes comprising a phloroglucine-mono-carboxylic acid alkyl ester and a salt the aqueous solution of which has an alkaline reaction.

8. A new composition of matter as claimed in claim 7 wherein the said alkyl ester group contains at most two carbon atoms.

9. A developer for diazotype purposes consisting in a mixture comprising a coupling component of the following general formula

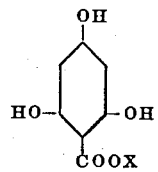

wherein X is a member of the group consisting of methyl and ethyl and a salt the aqueous solution of which has an alkaline reaction.

10. A method of producing diazo-type prints comprising selectively exposing a light-sensitive system containing a light-sensitive diazo compound, and coupling the diazo compound retained in the unexposed areas with a phloroglucine-mono-carboxylic acid alkyl ester.

OSKAR SÜS.